(12) United States Patent
Norman

(10) Patent No.: US 10,496,081 B2
(45) Date of Patent: Dec. 3, 2019

(54) METHOD FOR FULFILLING DEMANDS IN A PLAN

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 167 days.

(21) Appl. No.: 15/486,089

(22) Filed: Apr. 12, 2017

(65) Prior Publication Data

US 2018/0299872 A1    Oct. 18, 2018

(51) Int. Cl.
G05B 19/418    (2006.01)

(52) U.S. Cl.
CPC ........... *G05B 19/41865* (2013.01); *G05B 2219/32051* (2013.01); *G05B 2219/39159* (2013.01)

(58) Field of Classification Search
CPC .... G05B 19/41865; G05B 2219/39159; G05B 2219/32051
See application file for complete search history.

(56) References Cited

U.S. PATENT DOCUMENTS

| | | | | |
|---|---|---|---|---|
| 7,139,719 | B1 * | 11/2006 | Cherneff | G05B 19/41865 705/7.23 |
| 2003/0177050 | A1 * | 9/2003 | Crampton | G06Q 10/06 700/97 |
| 2006/0173724 | A1 * | 8/2006 | Trefler | G06Q 10/063112 705/7.14 |

* cited by examiner

*Primary Examiner* — Yuhui R Pan
(74) *Attorney, Agent, or Firm* — Patterson + Sheridan, LLP

(57) ABSTRACT

Embodiments presented herein provide techniques for generating and optimizing a plan in a manufacturing environment. The techniques begins by receiving a plurality of demands for a plan, wherein each demand of the plurality of demands has parameters specifying a set of operations, a due date, user specified business logic and priority. The demands are ranked based on the parameters and the user specified business logic. The plurality of demands is broken into sets of demands based on the a predefined number and the demand rank. The demands in a first set of demands are optimized to generate a strategy for fulfilling the demands in the first set of demands. One or more constraints are applied to the first set of demands to ensure the first set of demands is fulfilled in preference to the remaining sets of demands.

17 Claims, 2 Drawing Sheets

METHOD FOR FULFILLING DEMANDS IN A PLAN

BACKGROUND

Field

Embodiments of the present disclosure generally relate to planning, and more particularly to techniques for prioritizing demands in plans which manage production processes within a manufacturing environment.

Description of the Related Art

Manufacturing facilities across many different industries are responsible for producing products that are used in every facet of life. In the case of semiconductor manufacturing, for example, semiconductor manufacturing facilities manufacture products such as, microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many more. In recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. Because manufacturing is so capital intensive, even small increases in factory performance (e.g., such as building to demand, shortening order to delivery time, etc.) can have large effects on financial performance (e.g., by reducing cost through leaner manufacturing, freeing up capital tied to idle inventory, etc.). For this reason, many manufacturing facilities have implemented planning systems in their facilities to ensure the complex plan for products are providing for on-time deliveries.

Today, manufacturing facilities generally develop a planning system for planning all or part of the equipment in their facility. One of the key inputs to a planning system is the relative priority of the various demands that need to be planned. Some demands are more important and some less important. Typically in the customer's mind, the demands are grouped into sets of identical priority and then the groups are ranked in a relative order. For instance, all demands in week 1 might have highest priority, then the demands in week 2, and so forth. Alternatively, the demands for critical parts in week 1 might have highest priority, then the critical part demands in week 2, then the rest of the critical demands, followed by the demands for non-critical parts in week 1, the demands for non-critical parts in week 2, and so forth. Optimizations for these planning problems are done in terms of weights whereas a number rank is attributed to a demand for fulfilling the demand relative to a next demand. However, converting the real-world, customer understanding of the problem into mathematical weights is difficult. An objective function with weights may utilize variables and assign each a weight. For example, Weight1*UnshippedQty1+Weight2*UnshippedQty2+Weight3*UnshippedQty3+ . . . . But, this doesn't work if one demand has higher priority than another and its weight must be much larger than the second weight. The objective function specifies a cost for each possible plan, and the solver finds a plan that minimizes this cost. This leads to very large weights for the highest priority demands, and very small weights for the least important weights. The mathematical solvers have limited accuracy that doesn't handle a wide range in weights. Thus, the difficulty with this methodology is that it is not clear how to create the weights that satisfy the above requirement, particularly given the limited mathematical accuracy of state-of-the-art optimizers. Furthermore, weights are difficult for non-mathematically oriented users (i.e., planners) to understand and to manipulate. This creates a significant gap between the user's requirement and what the mathematical solver can provide for optimizing the fulfillment of demands in the plan.

There is a need for an improved method for optimizing which demands in a plan will be fulfilled.

SUMMARY

Embodiments presented herein provide techniques for generating and optimizing a plan in a manufacturing environment. The technique begins by receiving a plurality of demands, wherein each demand of the plurality of demands has parameters specifying a set of operations, a due date, business logic and priority. The demands are ranked based on the parameters and the business logic. The plurality of demands is broken into sets of demands based on a predefined number and the demand rank. The demands in a first set of demands are optimized to generate a priority for determining which demands should be fulfilled. One or more constraints are applied to the first set of demands to ensure the first set of demands is fulfilled in preference to the remaining sets of demands. The steps are repeated for the remaining sets of demands to develop the plan.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
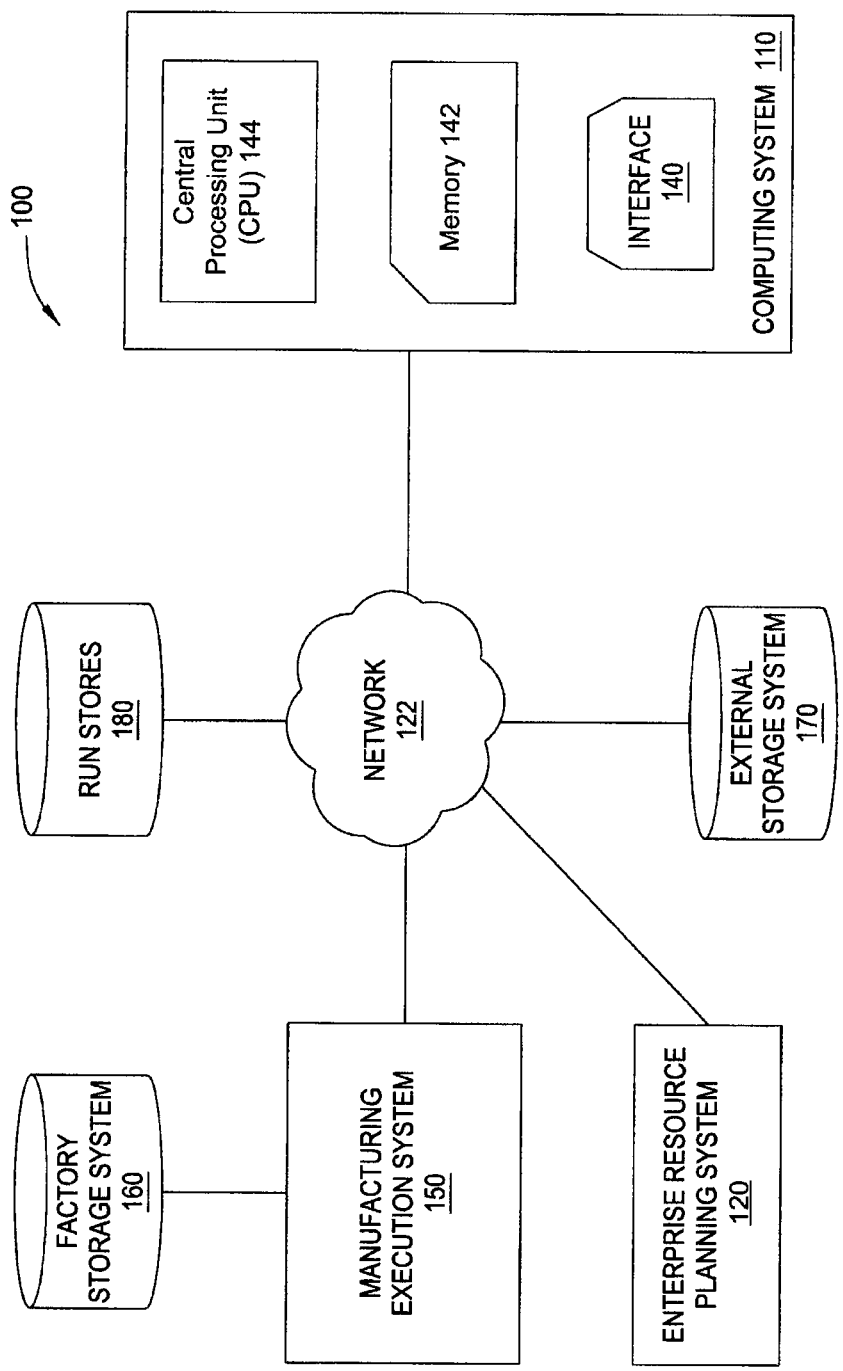
FIG. 1 illustrates a block diagram of one architecture for a manufacturing environment configured with a planning component, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present techniques for generating a plan to manage all or part of a manufacturing production process and makes commitments to customers concerning what shipment will be made on what dates. The plan could also be used for internal commitments to the sales department or to check when manufacturing needs to be outsourced. The demands are used by an end-user to construct the plan for managing one or more tasks performed within a manufacturing environment and/or controlling one or more devices within the manufacturing environment. The plan has a plurality of demands, e.g., orders, or sales forecasts. Each demand may describe a part or operation, a quantity to be performed, a due date, a priority, and a host of other operation specific information. The plan describes what steps will be worked on by which machines in a set of time buckets, wherein time buckets can be one shift, one day, one week, or even larger time periods. Information such as the number of machines available, their processing speeds, and other information needed to model how parts are processed in the factory are used to optimize the plan. Thus, the plan is optimized based on not only priority information of the demand but also process information regarding machine availability and time to completion for individual manufacturing operations. The plan is prepared for fulfilling a set of demands. However, it should also be appreciated that the plan also includes which demands will not be fulfilled along with those demands which will be fulfilled. The optimization of the plan considers the operation specific information in each demand for determining the fulfillment or non-fulfillment for each demand in the plan. Thus, for a set of demands, only some of which will be able to be fulfilled, the plan is optimize to determine which demands will be fulfilled in order to minimize the number of demands of each rank that are unfulfilled according to the customer's business preference of the relative demand priorities. It should be appreciated that creating a plan is something more substantial than creating a sequence of demands such as a schedule. Some demands cannot start earlier than a certain date, each demand competes for raw materials and machine capacity, etc. Thus, a plan sets out a methodology for fulfilling demands and equally important, determining that some demands cannot be fulfilled in accordance to customer desires. As will be described in more detail below, embodiments provide techniques that can be used to fulfill and optimize the organization of demands in the plan. It should be appreciated that the term 'fulfilled' means those demands which are completely fulfilled, those demands which are partially fulfilled (e.g., ship 50% of the quantity), as well as those demands which are not fulfilled at all.

Note that, for the sake of convenience, terminology related the manufacture of semiconductor devices is used in much of the following description as a reference example of a manufacturing production process that can be planned using the techniques presented herein. Similarly, many of the following embodiments use front-end and back-end semiconductor manufacturing facilities as reference examples of types of manufacturing environments in which the techniques presented herein can be used to provide a planning system that is open, extensible, and fully configurable by an end-user. Note, however, that the techniques presented herein can also be applied to other types of manufacturing environments (e.g., in other industries), manufacturing processes, etc.

FIG. 1 is a block diagram illustrating one architecture of a manufacturing environment (or system) 100, in which aspects of the present disclosure may be practiced. In one embodiment, the manufacturing environment 100 is an example of a semiconductor front-end or back-end manufacturing facility. As shown, the manufacturing environment 100 includes a computing system 110, manufacturing execution system (MES) 150, enterprise resource planning (ERP) system 120, factory storage system 160, external storage system 170, and run stores 180 connected via a network 122.

In general, the network 122 can be a wide area network (WAN), local area network (LAN), wireless LAN (WLAN), etc. The factory storage system 160, external storage system 170 and run stores 180, in general, can be any kind of storage system, including, for example, relational and/or hierarchal databases, distributed filing systems, network attached storage (NAS), storage-area network (SAN), etc. In one embodiment, the computing system 110, MES 150 and ERP system 120 can be any kind of physical computing system having a network interface, such as a desktop computer, laptop computer, mobile device, tablet computer, server computing systems, gateway computers, and the like.

The computing system 110 may include memory 142, central processing unit (CPU) 144, and user interface 140. The memory 142 may have data and applications stored therein. For example, the memory 142 may store planning data for use by a user. The memory 142 may also store applications such as a planning application configured to implement one or more of the operations for running on the CPU 144. The planning application may generate plans for the manufacturing environment 100. For example, in the case of semiconductor manufacturing, a user can generate plans for determining if capacity of the manufacturing system can satisfy demands, what changes (if any) the manufacturing system should implement to meet demands, project future output of the manufacturing system, determine which products the manufacturing system produces, where the products will be produced, the amount of products to produce, run experiments to determine what operations the manufacturing system should perform, etc.

The MES 150 and ERP system 120 are generally configured to manage and control the operation of a current work-in-progress (WIP) within the manufacturing environment 100. However, it should be appreciated that other systems may be configured to manage sources of data and operations in the manufacturing environment. The plans generated on the computing system 110 may be loaded into memory, manufacturing equipment, the ERP system 120, or other suitable locations for organizing the demands in the plan for fulfillment by the MES 150. For a front-end semiconductor manufacturing factory, the MES 150 can control one or more processes related to the fabrication of semiconductor substrates. For a back-end semiconductor manufacturing factory, the MES 150 can control one or more processes related to cutting, assembly, and testing of semiconductor die on the substrates. The MES 150 can monitor the operation of one or more tools (or equipment) operating in the manufacturing environment 100, receive data directly from the tools, receive data from the ERP system 120, analyze data from the tools and ERP system 120, and/or collect the data. In one embodiment, the MES 150 can store the data (received from the tools) into factory storage system 160. Such information stored in the factory storage system 160 can include information regarding the current WIP, number of tools in the manufacturing environment, operating parameters (e.g., processing speeds, capacity load, and the like) of the tools, manufacturing data, and other metadata characteristic of the manufacturing environment 100.

The ERP system 120 is configured to collect, store, manage and interpret data related to resources within the manufacturing environment (e.g., amount of capital, raw materials, production capacity, etc.), current and future commitments within the manufacturing environment (e.g., orders, projected sales, delivery dates, etc.), information related to supply chain management (e.g., such as information that describes movement and storage of raw materials, WIP inventory, amount of finished goods, finances, and other information related to the flow of goods and services from supplier to ultimately the consumer), and the like. In one embodiment, some or all of this information can be stored into the factory storage system 160, ERP system 120, or other suitable storage device. The collective information regarding a quantity of parts associated with a commitment to a customer is represented by a single demand. The collective demands are organized to form the plan.

The ERP system 120 may be configured to contain information for the demands, e.g., the list of demands and demand attributes. The information may be provided to external systems to optimize the organization of the demands in the plan for ensuring timely fulfillment. Alternately, the demands may be contained in an external system or other suitable location. The demands are planned based on prioritization along with a commitment for fulfillment, i.e., date. The demand attributes are converted to a rank based on business logic. The ranks may be computed "on demand" and not actually stored. Alternately, the demands may have a priority rank from the set of positive integers. The rank having a lower integer may represent a higher priority. For example, a demand having a rank of '1' may have a higher priority than a demand having a rank of '3'. The ERP system 120 may plan demands having a higher priority (as determined on the fly using demand attributes and business logic or by assessing demands with the lower rank number such as '1') prior to demands of the same time period having a lower priority (higher rank number such as '3').

A solution in implemented which allows the user to specify their business requirements directly using business logic on the demand attributes. The demands attributes are used to automatically optimize the demands into a series of optimization problems, each of which optimizes the plurality of demands into a plan. This gives an organization of demands that exactly matches the customer's business requirements where lower ranked demands imply higher priority are planned ahead of higher ranked demands.

Figure 2:
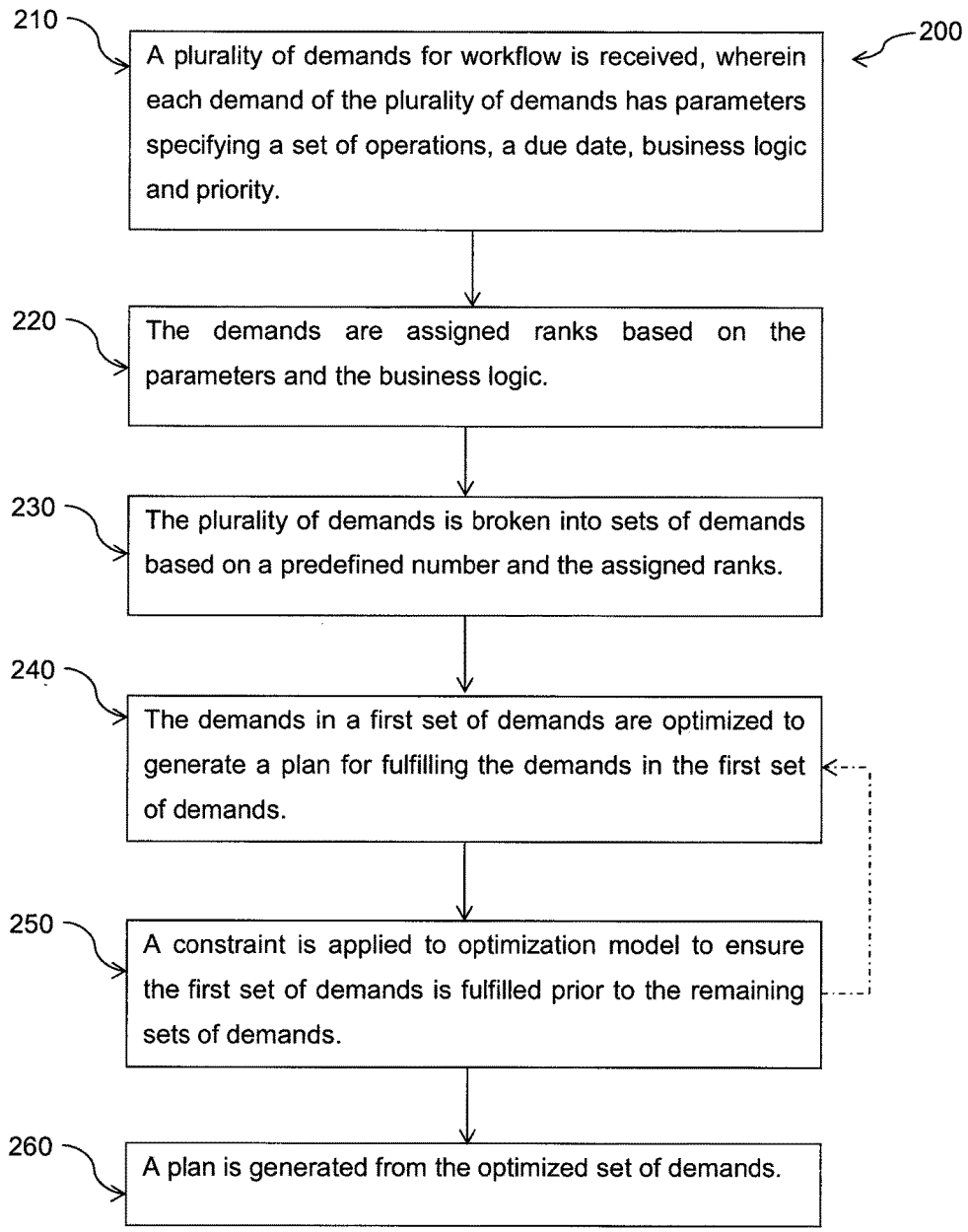
FIG. 2 is a flow diagram illustrating a method for optimizing demands in a plan for a manufacturing environment, in accordance with embodiments of the present disclosure.

FIG. 2 is a flow diagram illustrating a method 200 for organizing demands in a plan for a manufacturing environment, in accordance with embodiments of the present disclosure. In block 210, the method begins where a plurality of demands for a plan is received, wherein each demand of the plurality of demands has parameters specifying a set of operations, a due date, and priority as well as other attributes. At this stage, all the demands are handled together as the plurality of demands are received. External systems or sources provide the information for the demands to populate the demand parameters. The demand parameters provide information regarding the demand such as parts, quantity, etc.

Separately, the optimization parameters provide information useful in optimizing the scheduling of the set of demands (D) in the plan, i.e., optimization parameters, and may be part of the configuration of the system creating the plan. The optimization parameters may include the number of demand ranks to organize in each iteration ($N_O$), the base for constructing objective function weights (W), and other scheduling parameters.

The demands are ranked using the business logic to effect fulfillment. A rank is calculated for each demand where several demands can have the same rank. In block 220, the demands are provided ranks based on the parameters and the user specific business logic. The ranking is based on the demand parameters and the business logic for each of the demands. For example, a demand for which a request is made may be ranked lower than a demand for a business requirement. It should be appreciated that multiple demands may have the same rank. The ranks may be an integer such as the set of all positive integers or the integers between 0 and 20.

The user, i.e., planner, specifies the business logic that turns demand attributes into ranks. In a first example, the first demand is ranked ahead of the second demand. In a second embodiment, the second demand is ranked ahead of the first demand. The ranks for the demands from week 1 may be lower than the ranks of the demands from week 2. Prior weeks to week 1 may ranked even lower than of week 1 prior to optimizing the plan. An example of rankings that determine the series for optimization may be:

|   | Demand | Rank |
|---|---|---|
| 1 | Demand Week 1 Commit Part 1 | 1 |
| 2 | Demand Week 1 Commit Part 2 | 1 |
| 3 | Demand Week 1 Request Part 1 | 2 |
| 4 | Demand Week 2 Commit Part 1 | 3 |
| 5 | Demand Week 2 Commit Part 2 | 3 |
| 6 | Demand Week 2 Request Part 2 | 4 |
| 7 | Demand Week 3 Commit Part 1 | 5 |
| 8 | Demand Week 3 Commit Part 2 | 5 |

Alternately, the previous week commitments may be performed first, then current week requests. Thus, week 1 is provided with a low rank first, then week 2 with higher ranks, etc., and then an optimization of the ranking may be performed for each week based on the priority, i.e., commitment or request. An example of rankings that determine the series for optimization may be:

|   | Demand | Rank |
|---|---|---|
| 1 | Demand Week 1 Commit Item 1 | 1 |
| 2 | Demand Week 1 Commit Item 2 | 1 |
| 3 | Demand Week 1 Request Item 1 | 15 |
| 4 | Demand Week 2 Commit Item 1 | 2 |
| 5 | Demand Week 2 Commit Item 2 | 2 |
| 6 | Demand Week 2 Request Item 2 | 16 |
| 7 | Demand Week 3 Commit Item 1 | 3 |
| 8 | Demand Week 3 Commit Item 2 | 3 |

The demand ranks are calculated using customer-specified business logic and demands parameters, e.g., due date, priority, etc. . . . . This enables the demands to be optimized in a user defined manner for fulfilling specific customer and/or business requirements.

At block 230, the plurality of demands is broken into sets of demands based on a predefined number and the assigned ranks. For example, 200 demands may be broken down to sets of X demands each. Thus, a first set of demands may include the first 20 (where X=20) highest ranked demands from the plurality of demands. The second set of demands would include the next 20 highest ranked demands, i.e., the demands corresponding to 21-40 in the list of demands. It should be appreciated that the number X may be a variable which is user defined or calculated automatically based on the overall number of demands. The second set of demands may have fulfillment in the second week. In yet another methodology, a number of ranks will be optimized in a set. So if there are 20 ranks and each rank has 10 demands, and the first optimization group will pick ranks 1, . . . , 5, which will give a set of 50 demands to be optimized in the first group.

This is where the system decides which demands will be fulfilled and which won't. In block 240, the demands in a first set of demands are optimized to generate a plan for fulfilling the demands in the first set of demands. The solver uses an objective function to find an optimal or near-optimal solution that minimizes the value of the objective function. Although block 240 optimizing a first set of demands, it should be appreciated that each block 240 and block 250 are looped until the plurality of demands are optimized in the plan. Based on all input data, the system creates an optimization problem to optimize the demands within each set of demands. The system automatically converts the demand ranks into a series of optimization problems, each of which organizes some ranks. The solver may run through a plurality of iterations for determining the placement of each demand in the plan, i.e., determines which demands will be fulfilled and which may go unfulfilled according the customer requirements. The solver may first optimize ranks $1, \ldots, N_0$, then ranks $N_0+1, \ldots, 2 N_0$, then ranks $[2 N] N_{0+1}, \ldots, 3 N_0$, etc. So optimization i optimizes ranks $(i-1) N_0, \ldots, i N_0$. Where $U_D$ represents the percentage of the demand that is unfulfilled (0=completely fulfilled and 1=completely unfulfilled), for each optimization i: we can use the objective function $\Sigma_{r=(i-1)N_0}^{iN_0} \Sigma_{D \text{ is demand with rank } r} W^{iN_0-r} U_D$. This provides the lowest (highest-priority) ranks with a weight of $W^{iN_0-r}$ and the highest ranks a weight=1.

Advantageously, the organization of the demands exactly matches the business priority. The largest coefficient in any objective function is $W^{N_0-1}$. Thus, arbitrarily large ranks can be handled without numerical accuracy issues from the solver. The largest weight doesn't depend on the number of ranks.

In block 250, constraints are added to the optimization model. The constraints relate to the demands just organized. This happens in each iteration occurring at block 240. The constraints are utilized to prevent demands in later optimizations from being fulfilled in preference to demands in earlier optimizations, since the demands in earlier optimization have a more important rank. The constraints are utilized to constrain the optimization to maintain which demands are fulfilled such that the later ranks should not make the earlier ranks worse. The constraints force the ranks just organized to not get worse. $S_D$ is the value of the demand in the solution. $U_D$ may be used as a decision variable in the prioritization. For example, the optimization may attempt to minimize is $U_D$ where $U_D$ is 1 if the demand is partially or totally unfulfilled and may be made to be zero (0) if the demand is completely fulfilled. Alternatively, $U_D$ represents the percentage of the demand that is unfulfilled. That is, $U_D$ represents the percentage of the demand that is unfulfilled. In another example where each demand was previously constrained (See block 250), the plan may be implemented where $U_D \le S_D$ for all demands D. In a yet another example where the ranks are constrained, the plan may be implemented where the $\Sigma_{D \text{ is demand with rank } r} U_D \le \Sigma_{D \text{ is demand with rank } r} S_D$ for all demands D. Thus, the plan organization can be optimized such that a low priority demand is fulfilled in preference to high priority demands.

If there are still un-optimized sets of demands, the method 200 returns to block 240 for optimizing a next set of demands, i.e., a second or third set of demands. Each set of demands (N) is constrained to effect execution of the demand after a prior set of demands N−1 and before a next set of demands (N+1). This produces a fully organized plan according to the customer requirements. We can also have a dynamic algorithm where we can determine demand groups which have been newly organized and add constraints for those groups only. The next iteration we start with the first un-organized demand group. This method produces a fully organized solution. The demands may then be executed based on the plan. Alternately, the plan may not be executed, e.g., a user may run experiments (create multiple plans) to pick which plan they prefer, prior to choosing and executing that one plan.

The plan now has the demands organized in an optimal or near optimal manner for fulfilling the demands on time. In one embodiment, the enterprise resource planning system provides the plan to the manufacturing execution system for executing the order of the demands. The manufacturing execution system may direct demand execution on the process equipment (tools) attached to the manufacturing environment. Demands may run simultaneously on various tools giving priority to the plan. In another embodiment, the plan is used to provide commitments to the customer about which demands will be fulfilled or unfulfilled. In another embodiment, the planners use the plan to direct manufacturing of which parts to produce at which times.

For example, a plurality of 200 demands may be ranked between 1 and 20. The system may be configured to form sets of demands from the 200 demands. The demands in ranks 1 through 5 may form a first set of demands. The demands having ranks 6-10 may form a second set of demands. Similarly, a third and fourth set of demands may be formed. The first set of demands is optimized using an objective function. Constraints are added to the optimized demands in the first set of demands. The second set of demands may then be optimized. The second set of demands is then constrained to effect execution after those demands in the first set. This is repeated for the third and fourth set of demands. A plan is generated wherein the demands in the first set have highest priority for execution and in the first set of demands, each demand has a priority over a next demand. Thus, the demands from an earlier set of demands will not be preempted by a later set of demands without user interference. In this manner a plan for manufacturing may be determined and machines may be planned around the operations of each demand to yield the lowest operation costs, in terms of time, for satisfying all the demands.

In one embodiment, each week the manufacturer receives from its customers a set of requests for what will be produced over the next period or bucket of time, for example, twelve weeks. It should be appreciated that the bucket of time may be any period of time such as 2, 10, 11, 12, 13 weeks, etc. . . . which are all possible. This includes how many pieces of each part should be shipped at the end of each week. Every week, the system uses this and other information to produce a plan describing what will be worked on and what quantities will be shipped over a number of weeks, such as 12 weeks. The planners then communicate this information back to their customer as a commitment. They also then communicate what the plan says down to the factory. For example, the plan tells the factory when lots should be started and which tools should process which products.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantageously, the method described herein creates a plan for manufacturing demands which compete for resources in the manufacturing environment. The plan sets out a methodology for fulfilling demands and equally important, determining that some demands cannot be fulfilled in accordance to customer desires. Additionally, the plan may be used to identify manufacturing bottlenecks in resources or capabilities. Such identification can be rectified to lead to further enhanced manufacturing efficiencies.

While the foregoing is directed to embodiments of the present disclosure, other and further embodiments of the disclosure may be devised without departing from the basic scope thereof, and the scope thereof is determined by the claims that follow.

What is claimed is:

1. A method for planning in a semiconductor manufacturing environment, comprising:
   A. receiving a plurality of demands for a plan of equipment utilization in the semiconductor manufacturing environment, wherein each demand of the plurality of demands relates to a part, quantity, or operation of an equipment utilized, wherein each demand has parameters specifying at least a set of manufacturing operations, a due date, user specified business logic or priority;
B. assigning ranks to each of the demands based on the parameters and the user specified business logic;
C. breaking the plurality of demands into sets of demands based on a predefined number and the assigned rank;
D. optimizing the demands in a first set of demands to generate a strategy for fulfilling the demands in the first set of demands;
E. applying one or more constraints to an optimization model to ensure the first set of demands are fulfilled in preference to the remaining sets of demands;
F. creating a plan from operations A through E for utilizing manufacturing equipment in the semiconductor manufacturing environment; and
G. executing the plan to direct the utilization of the manufacturing equipment in fulfillment of the demand.

2. The method of claim 1 further comprising:
optimizing the demands in a second set of demands to generate an strategy for fulfilling the demands in the second set of demands; and
applying constraints to the second set of demands to ensure the second set of demands are executed after the first set of demands and prior to the remaining sets of demands.

3. The method of claim 2, further comprising:
Iteratively looping through D and E until all sets of the demands optimized; and
generating a plan based on the optimized sets of demands.

4. The method of claim 2, wherein optimizing the demands comprises:
determining the mathematical optimum or near optimal with the smallest cost in an objective function.

5. The method of claim 2, wherein the predefined number is a parameter of which may be configured prior to breaking up the plurality of demands into sets.

6. The method of claim 4, wherein two or more demands may have the same rank assigned thereto.

7. A non-transitory computer-readable medium containing computer program code that, when executed by a processor, performs an operation for optimizing a plan for a semiconductor manufacturing environment, the operation comprising:
A. receiving a plurality of demands for a plan of equipment utilization in the semiconductor manufacturing environment, wherein each demand of the plurality of demands relates to a part, quantity, or operation of an equipment utilized, wherein each demand has parameters specifying at least a set of manufacturing operations, a due date, user specified business logic or priority;
B. assigning ranks to each of the demands based on the parameters and the user specified business logic;
C. breaking the plurality of demands into sets of demands based on a predefined number and the assigned rank;
D. optimizing the demands in a first set of demands to generate a strategy for fulfilling the demands in the first set of demands;
E. applying one or more constraints to an optimization model to ensure the first set of demands are fulfilled in preference to the remaining sets of demands;
F. creating a plan from operations A through E for utilizing manufacturing equipment in the semiconductor manufacturing environment; and
G. executing the plan to direct the utilization of the manufacturing equipment in fulfillment of the demand.

8. The non-transitory computer-readable medium of claim 7, further comprising:
Iteratively looping through D and E until all sets of the demands optimized;
generating a plan based on the optimized sets of demands.

9. The non-transitory computer-readable medium of claim 7, wherein optimizing the demands comprises:
determining the mathematical optimum or near optimal with the smallest cost in an objective function.

10. The non-transitory computer-readable medium of claim 7, wherein the predefined number is a parameter of which may be configured prior to breaking up the plurality of demands into sets.

11. The non-transitory computer-readable medium of claim 10, wherein two or more demands may have the same rank assigned thereto.

12. A planning system for a semiconductor manufacturing environment, wherein the semiconductor manufacturing environment comprises a plurality of demands and one or more tools for processing the demands, the scheduling system comprising:
at least one processor; and
a memory containing a program that, when executed by the at least one processor, performs an operation for executing a plan for the semiconductor manufacturing environment, the operation comprising:
A. receiving a plurality of demands for a plan of equipment utilization in the semiconductor manufacturing environment, wherein each demand of the plurality of demands relates to a part, quantity, or operation of an equipment utilized, wherein each demand has parameters specifying at least a set of manufacturing operations, a due date, user specified business logic or priority;
B. assigning ranks to each of the demands based on the parameters and the user specified business logic;
C. breaking the plurality of demands into sets of demands based on a predefined number and the assigned rank;
D. optimizing the demands in a first set of demands to generate a strategy for fulfilling the demands in the first set of demands;
E. applying one or more constraints to an optimization model to ensure the first set of demands are fulfilled in preference to the remaining sets of demands;
F. creating a plan from operations A through E for utilizing manufacturing equipment in the semiconductor manufacturing environment; and
G. executing the plan to direct the utilization of the manufacturing equipment in fulfillment of the demand.

13. The planning system of claim 12, further comprising:
Iteratively looping through D and E until all sets of the demands optimized;
generating a plan based on the optimized sets of demands.

14. The planning system of claim 12, wherein optimizing the demands comprises:
determining the mathematical optimum or near optimal with the smallest cost in an objective function.

15. The planning system of claim 12, wherein the predefined number is a parameter of which may be configured prior to breaking up the plurality of demands into sets.

16. The planning system of claim 14, wherein two or more demands may have the same rank assigned thereto.

17. The method of claim 12 further comprising:
optimizing the demands in a second set of demands to generate an strategy for fulfilling the demands in the second set of demands; and applying constraints to the second set of demands to ensure the second set of demands are executed after the first set of demands and prior to the remaining sets of demands.

\* \* \* \* \*

UNITED STATES PATENT AND TRADEMARK OFFICE
CERTIFICATE OF CORRECTION

PATENT NO. : 10,496,081 B2  
APPLICATION NO. : 15/486089  
DATED : December 3, 2019  
INVENTOR(S) : David Everton Norman Page 1 of 1

It is certified that error appears in the above-identified patent and that said Letters Patent is hereby corrected as shown below:

On the Title Page

In item (57), in Column 2, in "Abstract", Line 9, delete "the a" and insert -- a --, therefor.

In the Claims

In Column 11, Line 2, in Claim 1, delete "logic" and insert -- logic, --, therefor.

In Column 11, Line 27, in Claim 3, delete "claim 2," and insert -- claim 1, --, therefor.

In Column 11, Line 28, in Claim 3, delete "Iteratively" and insert -- iteratively --, therefor.

In Column 11, Line 31, in Claim 4, delete "claim 2," and insert -- claim 1, --, therefor.

In Column 11, Line 35, in Claim 5, delete "claim 2," and insert -- claim 1, --, therefor.

In Column 11, Line 51, in Claim 7, delete "logic" and insert -- logic, --, therefor.

In Column 12, Line 3, in Claim 8, delete "Iteratively" and insert -- iteratively --, therefor.

In Column 12, Line 34, in Claim 12, delete "logic" and insert -- logic, --, therefor.

In Column 12, Line 52, in Claim 13, delete "Iteratively" and insert -- iteratively --, therefor.

Signed and Sealed this  
Eighteenth Day of February, 2020

Andrei Iancu  
*Director of the United States Patent and Trademark Office*